Feb. 18, 1969 V. P. M. BALLU 3,428,255

MANUALLY-CONTROLLED SPRAYING APPARATUS TO BE CARRIED ON THE BACK

Filed July 5, 1967 Sheet 1 of 2

Inventor
Vincent P. M. Ballu

By: Watson, Cole, Grindle & Watson
Attorneys

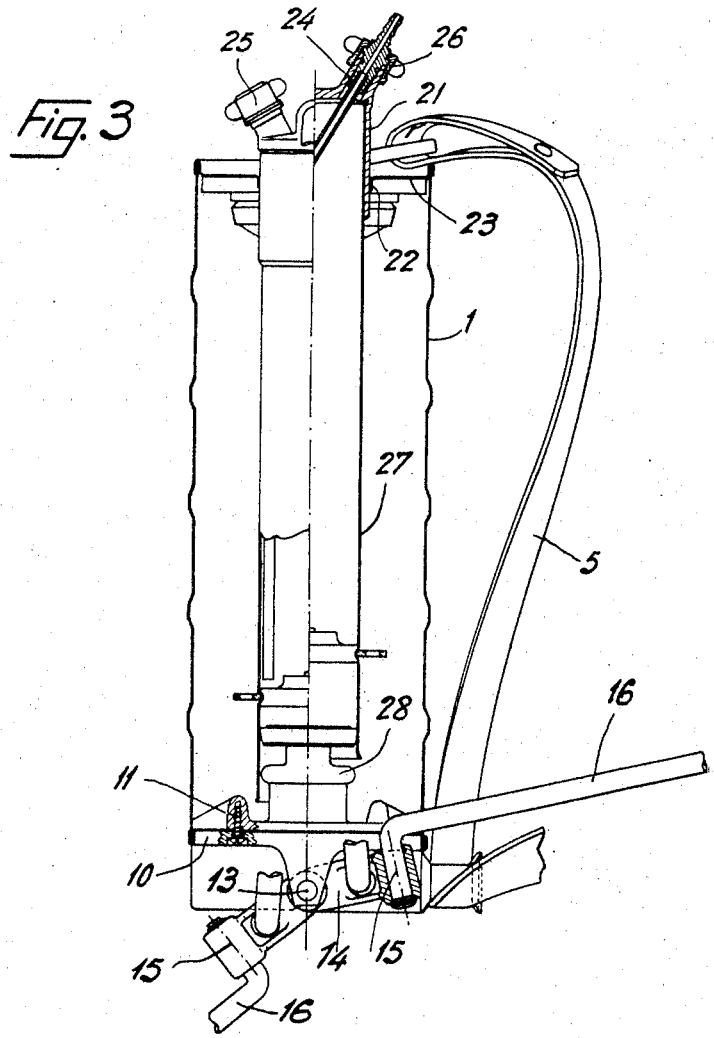
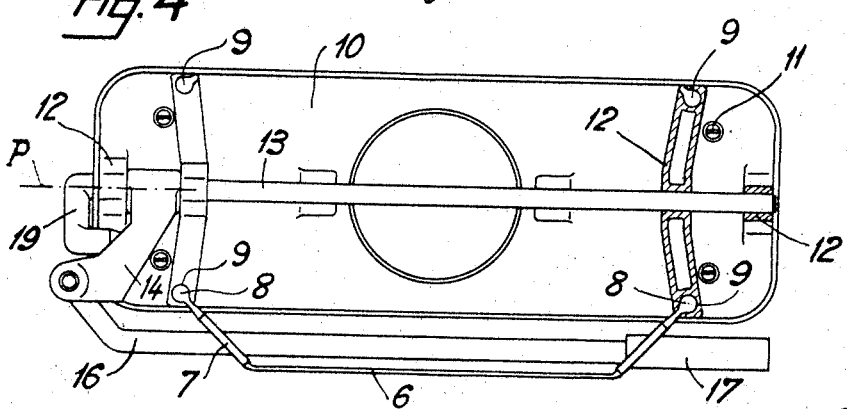

United States Patent Office 3,428,255
Patented Feb. 18, 1969

3,428,255
**MANUALLY-CONTROLLED SPRAYING APPARA-
TUS TO BE CARRIED ON THE BACK**
Vincent P. M. Ballu, Epernay, Marne, France, assignor
to TECNOMA, Epernay, Marne, France, a French
body corporate
Filed July 5, 1967, Ser. No. 651,192
Claims priority, application France, July 11, 1966,
69,011
U.S. Cl. 239—154                    9 Claims
Int. Cl. B05b 9/08; A62c 15/00

ABSTRACT OF THE DISCLOSURE

The specification discloses a form of spraying apparatus designed to be carried on the operator's back and principally characterised in that it can be adapted for use by left-handed and right-handed bearers without structural modification. For this purpose, the spray liquid reservoir has alternative attachment points for a lower back bar and shoulder straps extend to the bar from a pivoted upper mounting. Furthermore, the spray pump is operated by a reciprocatory handle offset laterally on the reservoir and which is pivoted on an axis perpendicular to its axis of reciprocation so that it can be swung to project to opposite sides of the reservoir, this in conjunction with the adjustability of the shoulder straps' mounting, locating it at either side of the bearer.

---

Numerous types of spraying apparatus, intended to be carried on the back of a man and actuated with the aid of a lever oscillated by the bearer are known.

The present invention has as an object to provide a spraying apparatus capable of ready adaptation so as to facilitate utilisation both by right-handed and by left-handed persons.

According to the invention, the spraying apparatus comprises a reservoir having longitudinally opposed regions that are symmetrical about a transverse median plane, a handle pivoted to the upper region of the reservoir about an axis in said transverse plane being arranged to receive shoulder straps that extend to a lower bar attachable to the lower region of the reservoir alternatively at opposite sides of said transverse plane, a pump in communication with the reservoir being operable by an actuating lever that is rotatable through at least 180° to project to opposite sides of said transverse plane, said oppositely projecting locations providing respective operating positions for left-handed and right-handed bearer of the apparatus.

The description which is given hereinbelow, with reference to the accompanying drawings, show one example of how the invention may be carried into effect.

In the drawings:

FIGURE 3 is a side sectional view of the apparatus, and

FIGURE 4 is a plan view from below.

Figure 2:
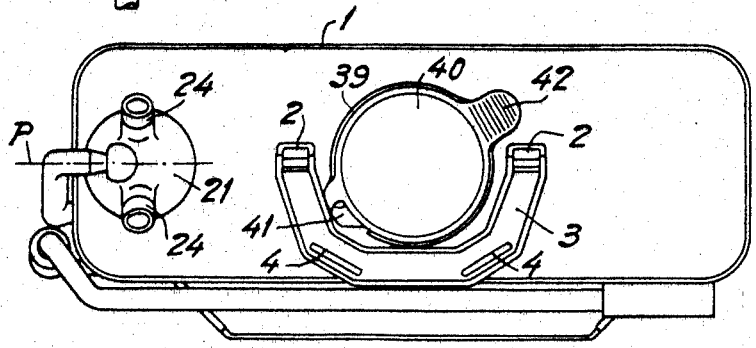
FIGURE 2 is a plan view from above of the spraying apparatus of FIG. 1.

Referring to the drawings, the spraying apparatus or atomiser comprises a reservoir 1 made of stainless steel sheet welded and crimped to a generally parallelepipedic shape that is symmetrical relative to a transverse median plane P (FIGURES 2 and 4).

Figure 1:
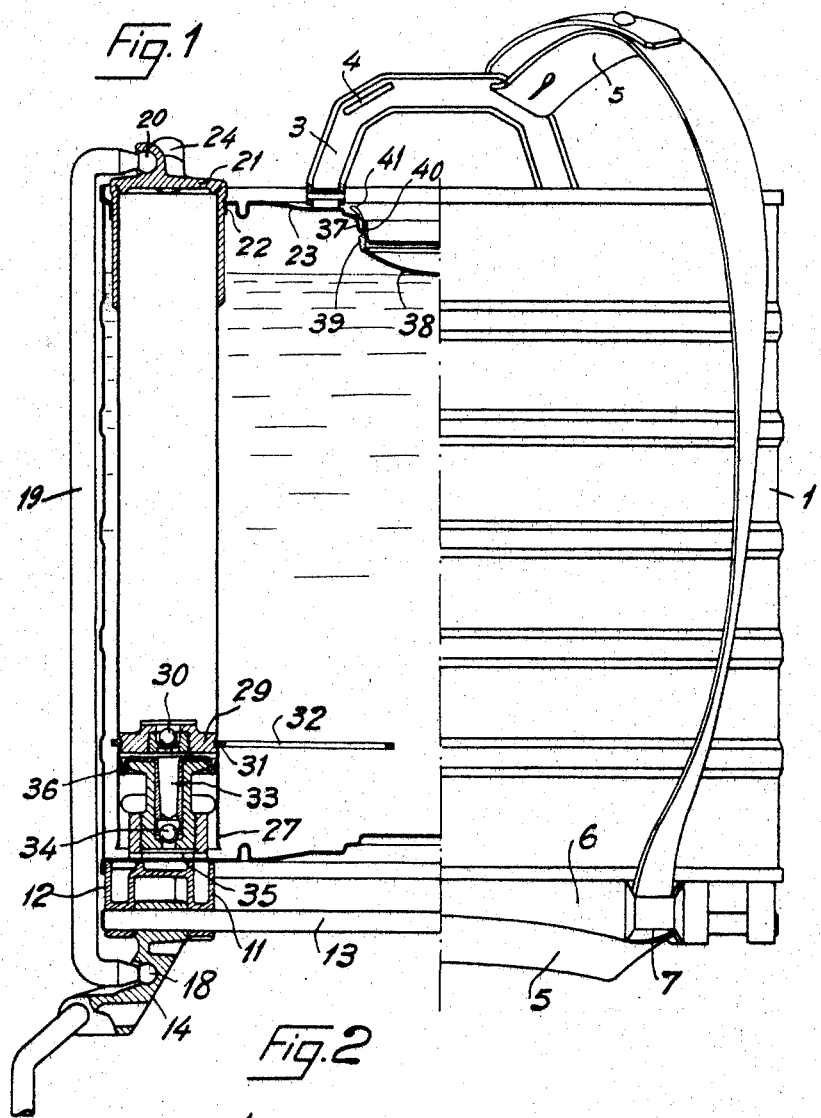
FIGURE 1 is a front view, with one half in section, of a spraying apparatus according to the invention.

Articulated to the upper region of the reservoir, through the agency of hinges 2, the pivots of which are located in the plane P, is a handle 3 which has substantially the shape of a wide U and is formed, in the vicinity of its cranked portions, with slots 4 through which shoulder straps 5 may be passed in the manner shown in FIGURES 1 and 3.

The said shoulder straps extend from the handle to the lower region of the reservoir and engage a back bar 6 which is formed with lateral recesses 7 for this purpose. The bar 6, which is intended to bear on the back of the user, has as its ends cylindrical engagement bearing faces 8 by means of which it is possible to fit it in apertures 9 formed in a base 10 secured under the bottom of the reservoir (as shown in FIGURES 3 and 4) by means of screws 11. The apertures 9 are formed along the two transverse edges of the base 10, symmetrically with respect to the plane P, so that it becomes possible, in combination with the oscillating handle, to mount the shoulder straps in such manner that the reservoir may bear on the back of the bearer through either one of its larger or transverse faces.

Under the reservoir, in the plane of symmetry P, the base 10 has secured to it bearings 12 in which is mounted a transverse pivot shaft 13 about which a rocking member 14 is adapted to oscillate. Articulated on the said rocking member, through a pivot joint having an axis 15 perpendicular to the axis of the pivot shaft 13, is a cranked lever 16 which is provided with a handle 17 and which may either be swung back to lie along the bottom of the reservoir, as shown in FIGURE 4, or displaced into a plane substantially perpendicular to the plane P. The freedom for oscillation of the rocking member about the pivot 13 is sufficient to make it possible to dispose the lever 16 towards the one or other of the large transverse faces of the reservoir so that it projects one way or the other from the plane P depending on whether the user wishes to actuate the lever with the right or with the left hand. The position of the shoulder strap 5 and of the bar 6 is naturally adjusted accordingly. The rocking member 14 serves also for transmitting the movement imparted to the lever 16 to actuate the pump of the spraying apparatus.

For this purpose, it is articulated, by means of a ball and socket joint 18, the main pivot of which is substantially parallel to the pivot 13, to a connecting rod 19 (FIGURE 1) articulated, by means of a further ball and socket joint 20, to a yoke 21 sliding in fluid-tight manner in an aperture having a downturned edge 22 and formed in the cover 23 of the reservoir. As is clear from FIGURES 2 and 3, the yoke also has its centre line in the plane P. This double ball-joint mounting eliminates practically any reaction on the guide means of the pump and provides for extremely gentle functioning.

The yoke 21 has two nozzles 24 disposed symmetrically to opposite sides of the plane P (FIGURE 2 and 3). One of the nozzles is blocked by means of a plug 25, whereas there is fitted on the other a union 26 serving for connecting a spraying tube (not shown). The user may make use of one or other of the nozzles depending, notably, on whether he is left-handed or right-handed.

The yoke 21 caps a cylinder 27 which, as shown in FIGURES 1 and 3, descends almost as far as the bottom of the reservoir where it co-operates with a piston 28 secured within the reservoir, on the bottom thereof, by means of some of the screws 11 which serve for the mounting of the base 10 (FIGURE 3). The axes of the piston and of the cylinder are also located in the plane P.

The cylinder 27 contains, slightly above its lower, open end, a partition 29 provided with a ball-type non-return valve 30. The partition is secured in the cylinder by a set groove 31 serving also to mount an agitator 32 (FIGURE 1).

The piston 28, against which the partition 29 almost abuts when the cylinder reaches the lowest point in its stroke, includes a central conduit 33 extending from end to end of the piston and containing a ball-type non-return valve 34. The conduit 33 communicates, at the bottom of the piston, with the main volume of the reservoir, through transverse passages 35.

A packing 36 provides for fluid-tightness of the piston in the cylinder.

The functioning of the pump is simple and effective. Due to the operation of the valves 30 and 34 as the cylinder is reciprocated, the liquid is urged into the cylinder 27 which forms a pressure reservoir. The said cylinder is easy and inexpensive to manufacture. The yoke 21, which may be manufactured from a synthetic plastics material, injection-moulded on the body of the cylinder, provides a good coefficient of friction and satisfactory fluid-tightness relative to the edge 22 of the upper wall 23 of the reservoir.

Formed in the wall 23 is furthermore, as shown in FIGURES 1 and 2, a filling orifice 37 closed by a filter/cover assembly which may be manufactured in the following manner; the filter, which consists of a circular screen 38, is fitted on an injection-moulding press with a collar 39 made of plastics material and joined to the cover 40 by means of a tongue 41. The cover has a lug 42 (FIGURE 2).

The collar 39 is engaged in the orifice 37 and the cover 40 in the collar 39. When a pull is exerted on the lug 42, the cover is removed and, when a pull is exerted on the tongue 41, the filter may be disengaged from the aperture.

It is self-evident that modifications may be made in the embodiment just described, notably by substituting equivalent technical means, without thereby departing from the scope of the present invention.

What I claim and desire to secure by Letters Patent is:

1. Spraying apparatus intended to be carried on the back of a bearer and comprising, in combination, a reservoir having longitudinally opposed regions that are symmetrical about a transverse median plane, a handle at the upper region of the reservoir, articulation means connecting the handle to the reservoir and having a pivot axis in said transverse plane, a lower bar and attachment means at the lower region of the reservoir for engagement with said bar to mount it at alternative positions on opposite sides of said transverse plane, shoulder straps extending between said handle and the lower bar, a pump in communication with the interior of the reservoir, an oscillatory lever mounted to the reservoir for operation of said pump, said lever being rotatable through at least 180° to project to opposite sides of the transverse plane, said oppositely projecting locations providing respective operating positions for left-handed and right-handed bearers of the aparatus.

2. Spraying apparatus according to claim 1 further characterised in that the reservoir pump comprises a cylinder slidably mounted in an upper wall of the reservoir, a piston fixed within the reservoir at or adjacent a lower wall of the reservoir being arranged to co-operate with the cylinder, non-return valves being provided both on the cylinder and the piston to cause a flow through the pump as the cylinder in reciprocated on the piston.

3. Spraying apparatus according to claim 2 further characterised in that a mounting within the cylinder carries the cylinder non-return valve so that it approaches close to the piston when the cylinder moves to its bottom position, the body of the cylinder between said valve and the piston forming a pressure chamber.

4. Spraying apparatus according to claim 3 further characterised in that a recess is formed in the cylinder to secure the valve mounting thereto, an agitator reciprocable with the cylinder being secured to the exterior of the cylinder at said recess.

5. Spraying apparatus according to claim 1 further characterised in that a rocker member is mounted on a pivot secured to the reservoir to extend in said transverse plane, the actuating lever and an oscillatory element of the reservoir pump being secured to portions of the rocker member whereby oscillation of the lever about the rocker member pivot axis actuates the pump, attachment means securing the lever to the rocker member including a pivot joint transverse to the rocker member pivot axis, the lever being rotatable on said joint between said oppositely projecting locations and being further displaceable by rotation on said joint to a non-operative position in which it lies at or adjacent a wall of the reservoir.

6. Spraying apparatus according to claim 5 further characterised in that the reservoir pump comprises a cylinder slidably mounted in an upper wall of the reservoir, a piston fixed within the reservoir at or adjacent a lower wall thereof being arranged to co-operate with the cylinder, a yoke at an upper end of said cylinder projecting from the reservoir, a connecting rod extending between the rocker member and said yoke, respective ball and socket joints connecting said rod to the member and to the yoke, non-return valves being provided both on the cylinder and the piston to cause a flow through the pump as the cylinder is reciprocated on the piston by the reciprocation of the connecting rod actuated by oscillation of the rocker member.

7. Spraying apparatus according to claim 6 further characterised in that the yoke is made of a synthetic plastics material and a downturned edge is formed at an aperture in the wall of the upper region of the reservoir to engage the yoke, the yoke being displaceable with the cylinder and the engagement surfaces between said yoke and the aperture edge being arranged to have a low coefficient of friction.

8. Spraying apparatus according to claim 6 further characterised in that the centre line of the pump lies in said transverse median plane of the reservoir and two liquid outlet nozzles are provided on the yoke, said nozzles projecting symmetrically to opposite sides of said transverse plane.

9. Spraying apparatus according to claim 1 further characterised in that an orifice is provided in a top wall of the reservoir to receive a closure assembly, said assembly comprising a filter member and a cover member, the filter member being engageable directly with said orifice, a flexible tongue joining the filter member and the cover member and a rim of the filter member providing sealing engagement for the periphery of the cover member.

References Cited

UNITED STATES PATENTS 2,162,057    6/1939    Brandt et al. _____ 239—154

EVERETT W. KIRBY, *Primary Examiner.*